United States Patent [19]

Inui et al.

[11] Patent Number: 5,107,486
[45] Date of Patent: Apr. 21, 1992

[54] OPTICAL MEMORY DEVICE WITH GROOVES AND PITS IN SELECTED DIMENSIONAL RELATIONSHIP

[75] Inventors: Tetsuya Inui; Junji Hirokane; Toshihisa Deguchi; Kenji Ohta, all of Nara, Japan

[73] Assignee: Sharp Kabushiki Kaisha, Osaka, Japan

[21] Appl. No.: 497,099

[22] Filed: Mar. 21, 1990

Related U.S. Application Data

[63] Continuation of Ser. No. 07/296,334, Jan. 10, 1989, abandoned, which is a continuation of Ser. No. 06/934,484, Nov. 24, 1986, abandoned.

[30] Foreign Application Priority Data

Dec. 4, 1985 [JP] Japan .................. 60-273855

[51] Int. Cl.$^5$ .................................................. G11B 7/24
[52] U.S. Cl. .................... 369/275.4; 369/275.1
[58] Field of Search ............. 369/275.1, 275.3, 275.4, 369/100, 124, 284, 286, 109

[56] References Cited

U.S. PATENT DOCUMENTS 4,587,648  5/1986  Ando .................................. 369/275

FOREIGN PATENT DOCUMENTS

| 0108258 | 5/1984 | European Pat. Off. ............ 369/275 |
| 57-147115 | 9/1982 | Japan . |
| 58-102338 | 6/1983 | Japan .................................. 369/275 |
| 58-102347 | 6/1983 | Japan .................................. 369/275 |
| 59-38943 | 3/1984 | Japan . |
| 60-127536 | 7/1985 | Japan . |
| 60-239949 | 11/1985 | Japan .................................. 369/275 |
| 62-82813 | of 1987 | Japan . |

OTHER PUBLICATIONS

Fujii et al., "Groove Characteristics of Reag.-op disk", published in Sharp Giho, No. 33, p. 22 (1985).

Primary Examiner—Stuart S. Levy
Assistant Examiner—Hoa Nguyen
Attorney, Agent, or Firm—Morrison & Foerster

[57] ABSTRACT

An optical memory device has grooves for guiding a light spot and pits for serving as track number indicators. The width $W_1$ and depth $d_1$ of the grooves and the width $W_2$ and depth $d_2$ of the pits are so selected that $2D(W_1, d_1) = 1 + D(W_2, d_2)$ where $D(W_1, d_1)$ and $D(W_2, d_2)$ are respectively the reflectivity of the groove and the pit.

3 Claims, 2 Drawing Sheets

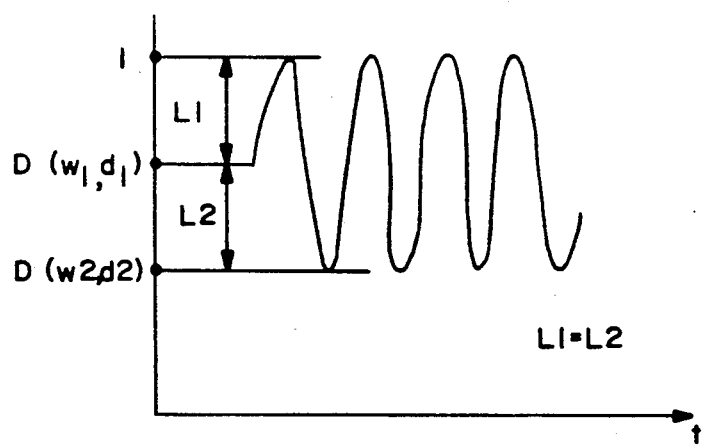
FIG.—1
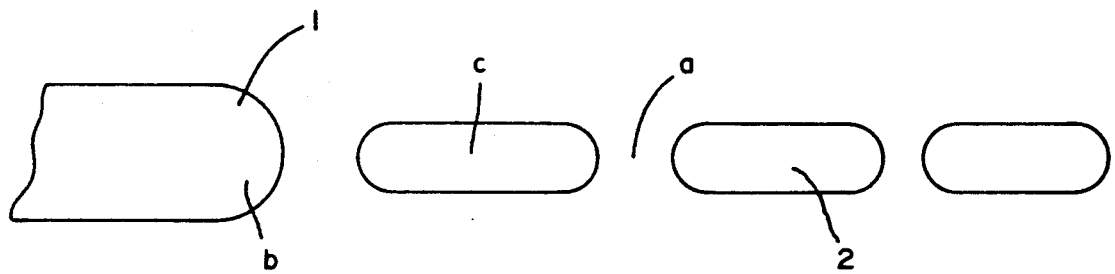
FIG.—2
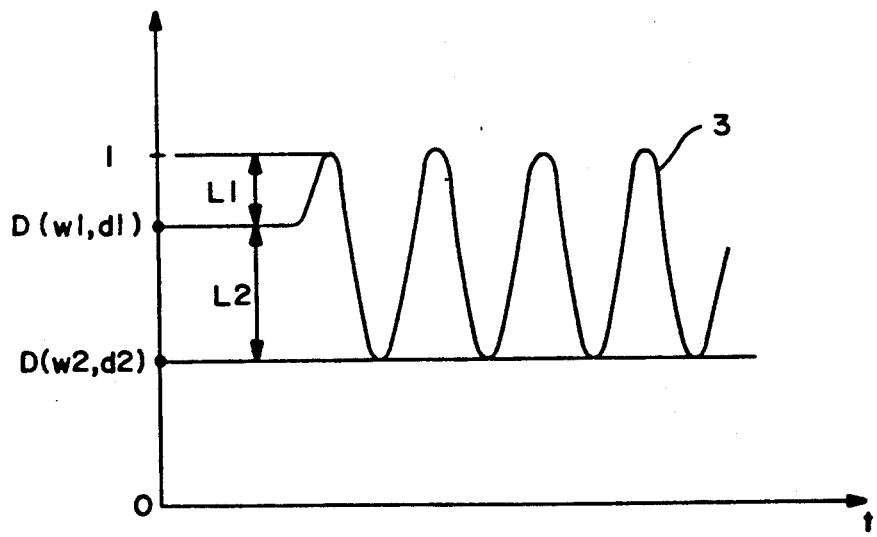
FIG.—3

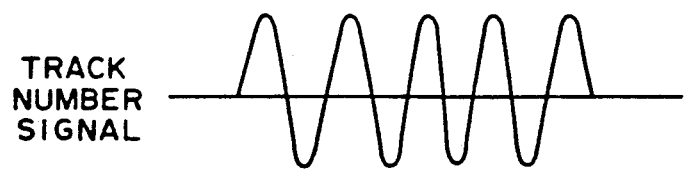
TRACK NUMBER SIGNAL
FIG.—4A (PRIOR ART)
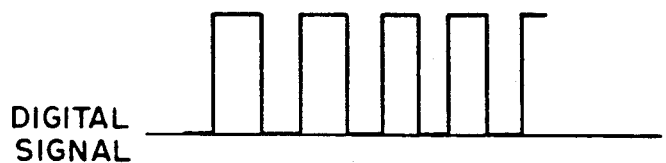
DIGITAL SIGNAL
FIG.—4B (PRIOR ART)
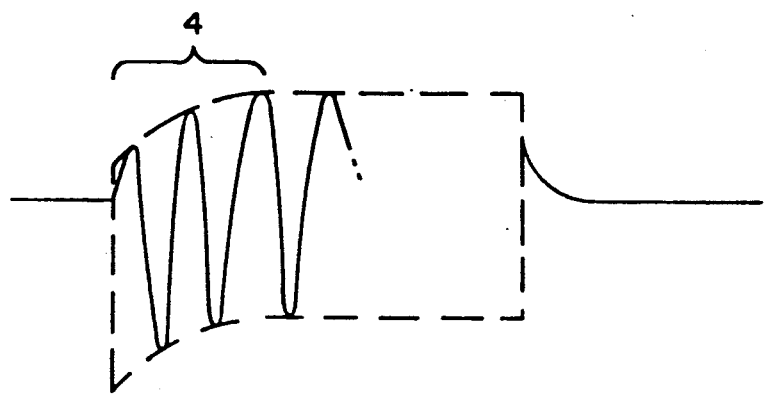
FIG.—5 (PRIOR ART)
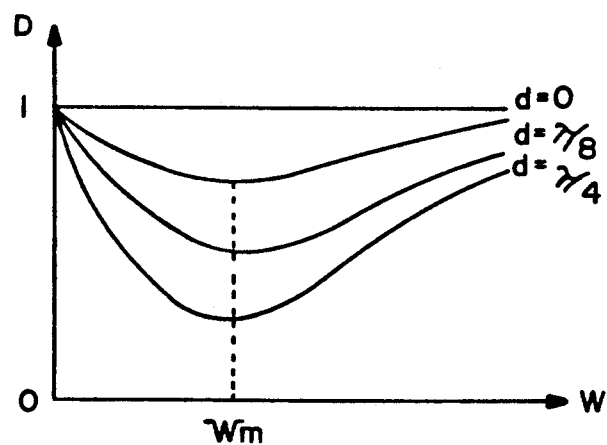
FIG.—6

OPTICAL MEMORY DEVICE WITH GROOVES AND PITS IN SELECTED DIMENSIONAL RELATIONSHIP

This is a continuation of application Ser. No. 296,334 filed Jan. 10, 1989, now abandoned, which is a continuation of application Ser. No. 934,484 filed Nov. 24, 1986, now abandoned.

BACKGROUND OF THE INVENTION

This invention relates to an optical memory device and more particularly to an optical disc for recording and reproduction of data by laser light.

Optical discs are being developed as large-capacity memory means. Optical discs of the add-on type (that is, the draw-type discs having $TeO_x$ and the like as the medium) and the rewritable type (that is, magnetooptical discs with rare earth-transition metallic alloy as the medium) have grooves for recording and track number sections where track position information is recorded by providing small holes, or "pits" to the substrate as described, for example, in U.S. patent application Ser. No. 767,537 now abandoned and assigned to the present assignee.

FIG. 2 is a plan view of a small portion of an optical memory device, showing one of its grooves 1 and a few of such pits 2. An output signal representing a track number recorded in the form of pits is illustrated in FIG. 3 and such a track number signal is generally amplified by an AC amplifier, not a DC amplifier. If this track number signal is sliced at the center as shown in FIG. 4(a), or the zero-level, to convert it into a digital signal, a waveform as shown in FIG. 4(b) may be obtained. By a signal processing procedure of this type, however, there are situations in which the result looks as shown in FIG. 5. This may happen, for example, when the upward amplitude $L_1$ of the track number signal and its downward amplitude $L_2$ are unequal as shown in FIG. 3, because the DC component of the track number signal is different between the pit section and the groove section, and the transient response of the AC amplifier distorts the envelope of the signal at the beginning as shown by the numeral 4 in FIG. 5. If such a distorted signal is sliced at the zero-level of the signal as a whole as explained above, the signal is not sliced at the actual zero-level in the area where the envelope is distorted, and the digital signal thus obtained will be an incorrect one.

An optical device having such an AC amplifier and using such an optical disk with grooves and pits has been disclosed, for example, in Japanese Patent Publication Tokkai 60-127536 filed Dec. 14, 1983 and published Jul. 8, 1985, which publication will be herein incorporated by reference.

SUMMARY OF THE INVENTION

It is therefore an object of the present invention to provide an optical disc which is so structured that there results no difference in the DC component between the groove section and the pit section.

The above and other objects of the present invention are achieved by selecting the depths and widths of the grooves and pits in such a way that the aforementioned disadvantages and drawbacks can be eliminated.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a graph of a signal obtained from an optical memory device embodying the present invention, FIG. 2 is a plan view of a portion of an optical memory device, FIG. 3 is a graph of a signal obtained from a prior art optical memory device, FIGS. 4(a) and 4(b) show waveforms of a track member signal and a digital signal obtained therefrom, FIG. 5 is a distorted signal waveform, and FIG. 6 is a graph showing the relationship between reflectivity of a groove and its width.

DETAILED DESCRIPTION OF THE INVENTION

When a small groove for guiding a light spot or a pit formed on the surface of a substrate is exposed to a laser beam, the beam is diffracted and the intensity of the reflected light is less at such a groove than from a flat area. The intensity of this reflected light, or reflectivity D, varies as shown in FIG. 6 as a function of the width W and the ratio between the depth d of the groove and the wavelength λ of the light. The value of W at which D assumes a minimum value is generally independent of d and is given (as explained in U.S. patent application Ser. No. 767,537 filed Aug. 20, 1985 now abandoned and assigned to the present assignee and thereafter in a publication entitled "Groove Characteristics of Magneto-Optic Disk" by Y. Fujii, J. Hirokane, T. Inui, A. Takahashi, T. Deguchi, K. Ohta and S. Katoh published in Sharp Giho, No. 33, p. 22 (1985) both of which are hereby incorporated by reference). by $W_m \simeq 0.64 r_o$ where $r_o$ is the spot radius beam used for the "reading". A spot with radius about 0.5 microns is typically used for this purpose. Reflectivity at the point indicated by "a" in FIG. 2 is approximately 1 because this corresponds to a flat area. Reflectivity at "b" above a groove will be denoted by $D(W_1, d_1)$, $W_1$ and $d_1$ being the width and the depth of the groove, respectively, and reflectivity at "c" above a pit will be likewise denoted by $D(W_2, d_2)$, $W_2$ and $d_2$ being the width and the depth of the pit, respectively.

An attempt was made previously to make the track number signal distinguishable by choosing the groove and pit depths and widths such that $$1 > D(W_1, d_1) > D(W_2, d_2).$$

According to the present invention, $W_1$, $d_1$, $W_2$ and $d_2$ are so selected that the condition $$1 - D(W_1, d_1) = D(W_1, d_1) - D(W_2, d_2) \quad (1)$$

is satisfied, or $$2D(W_1, d_1) = 1 + D(W_2, d_2). \quad (2)$$

If this condition is satisfied, the track number signal obtained from such a disc appears as shown in FIG. 1, that is, its upward amplitude $L_1$ and its downward amplitude $L_2$ become approximately equal to each other. In other words, the DC level in the groove section becomes approximately equal to that of the track number section and, if this signal is passed through an AC amplifier, there is no effect of transient response and there results no distortion of the envelope of the signal. For this reason, the signal can be sliced at the zero-level without resulting in any incorrect digital signal. As shown in FIG. 1, the difference in reflectivity L1 between the grooves and the flat surface is equal to the difference in reflectivity L2 between said grooves and said pits.

The condition given by Equation (2) above can be satisfied by any number of combinations of widths and depths. If one sets $d_1=d_2=\lambda/8$ and selects the groove widths $W_1$ to be 0.8 microns, for example, it is found from FIG. 6 (shown more precisely in FIG. 3(a) in the aforementioned publication by Fujii, et al.) that $D(0.8, \lambda/8)=0.789$ ($r_o$ being assumed to be 0.5 microns). One then obtains from Equation (2) that $D(W_2, \lambda/8)=-1+2\times0.789=0.578$. From FIG. 6, this means that the widths of the pit $W_2$ must be about 0.46 microns. In other words, if the grooves and pits are given the same depths but their widths are so selected that $W_1=0.8$ microns and $W_2=0.46$ microns, the resultant signal appears approximately as shown in FIG. 1 and the effects of transient response of an AC amplifier becomes small. As indicated above, this is only one example of combinations satisfying the condition of Equation (2). There are many other such combinations and not only the widths but the depths may also be changed.

In summary, the present invention eliminates the effects of transient response of an amplifier even if an AC amplifier is used to amplify track number signals of an optical memory device and makes it possible to obtain digital signals with reduced error probabilities.

What is claimed is:

1. An optical memory device having grooves for guiding a light spot and pits for serving as track number indicators, said pits and grooves being disposed in series with a flat surface sandwiched therebetween, wherein the relationship between the width $W_1$ and depth $d_1$ of said grooves and the width $W_2$ and depth $d_2$ of said pits is determined so that a difference in reflectivity between said grooves and said flat surface is equal to a difference L2 in reflectivity between said grooves and said pits.

2. An optical memory device according to claim 1, wherein the reflectivity $D(W_1, d_1)$ of said grooves and the reflectivity $D(W_2, d_2)$ of said pits have the following relationship, when the reflectivity of said flat surface is 1:

$$2D(W_1, d_1)=1+D(W_2, d_2).$$

3. An optical memory device according to claim 1, wherein $d_1=d_2$, $W_1$ is about 0.8 microns and $W_2$ is about 0.46 microns.

* * * * *